United States Patent [19]

Baron et al.

[11] 4,303,776

[45] Dec. 1, 1981

[54] BIS(4-HYDROXYPHENYL SULFONYLPHENYL) BISPHENYL DISULFONES AND USEFUL RESINS BASED THEREON

[75] Inventors: Arthur L. Baron; Parameswar Sivaramakrishnan, both of New Martinsville, W. Va.

[73] Assignee: Mobay Chemical Corporation, Pittsburgh, Pa.

[21] Appl. No.: 943,515

[22] Filed: Sep. 18, 1978

[51] Int. Cl.$^3$ .................... C07C 147/10; C08G 75/20
[52] U.S. Cl. .................................. 528/171; 528/85; 528/173; 528/174; 528/175; 568/33
[58] Field of Search ............... 260/607 AR; 528/85, 528/171, 173, 174, 175; 568/33

[56] References Cited

U.S. PATENT DOCUMENTS

| | | | |
|---|---|---|---|
| 2,288,282 | 6/1942 | Huismann | 260/607 |
| 3,269,986 | 8/1966 | Goldberg | 260/49 |
| 3,579,591 | 5/1971 | Schnell et al. | 260/607 AR |
| 3,647,751 | 3/1972 | Darsow | 260/607 AR |
| 3,719,714 | 3/1973 | Leslie et al. | 260/607 AR |
| 3,726,927 | 4/1973 | Leslie et al. | 260/607 AR |
| 3,729,447 | 4/1973 | Haberland et al. | 260/47 |
| 3,809,682 | 5/1974 | Studinka et al. | 260/61 |
| 3,862,990 | 1/1975 | Newton et al. | 260/607 AR |
| 4,075,119 | 2/1978 | Schmidt et al. | 252/182 |

FOREIGN PATENT DOCUMENTS

| | | |
|---|---|---|
| 2520317 | 11/1976 | Fed. Rep. of Germany . |
| 2134505 | 12/1972 | France . |
| 1151042 | 5/1969 | United Kingdom . |
| 1190135 | 4/1970 | United Kingdom . |

Primary Examiner—H. S. Cockeram
Attorney, Agent, or Firm—Gene Harsh; Lawrence S. Pope; Thomas W. Roy

[57] ABSTRACT

The present invention relates to the novel monomers generically identified as bis(4-hydroxyphenyl sulfonylphenyl) biphenyl disulfones, to a process for their production and to their use in the preparation of polycarbonates, polyurethanes, polyesters, polysulfones and polyethers.

16 Claims, No Drawings

BIS(4-HYDROXYPHENYL SULFONYLPHENYL) BISPHENYL DISULFONES AND USEFUL RESINS BASED THEREON

SUMMARY OF THE INVENTION

The present invention comprises novel monomers generically identified as bis(4-hydroxyphenyl sulfonylphenyl) biphenyl disulfones of the structural formula:

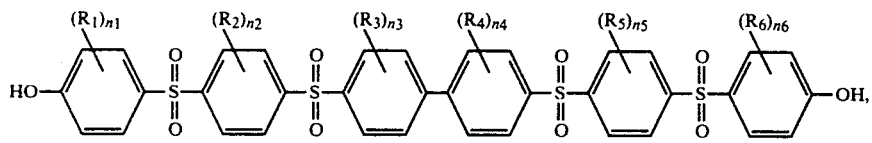

wherein:

$R_1$, $R_2$, $R_3$, $R_4$, $R_5$ and $R_6$, which may be the same or different, are $C_1$–$C_4$-alkyl, Cl or Br, and $n_1$, $n_2$, $n_3$, $n_4$, $n_5$ and $n_6$, which may be the same or different, are 0, 1 or 2, to a process for their synthesis and to polycarbonates, polyurethanes, polyesters, polysulfones and polyethers prepared from these novel monomers.

DETAILED DESCRIPTION OF THE INVENTION

The bis(4-hydroxyphenyl sulfonylphenyl) biphenyl disulfones of the present invention have the general structural formula:

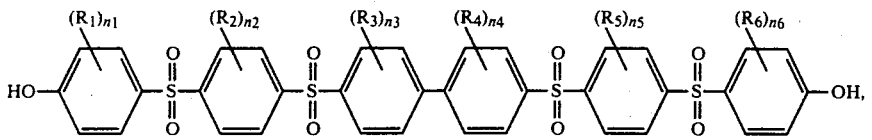

wherein $R_1$, $R_2$, $R_3$, $R_4$, $R_5$ and $R_6$, which may be the same or different, are $C_1$–$C_4$-alkyl, Cl or Br, and $n_1$, $n_2$, $n_3$, $n_4$, $n_5$ and $n_6$, which may be the same or different, are 0, 1 or 2.

A route suitable for the synthesis of the generic bis(4-hydroxyphenyl sulfonylphenyl) biphenyl disulfones is illustrated by the following general reaction scheme for the synthesis of bis(4-hydroxyphenyl sulfonylphenyl) biphenyl disulfone ($n_1$–$n_6$=0), the preferred monomer of the present invention:

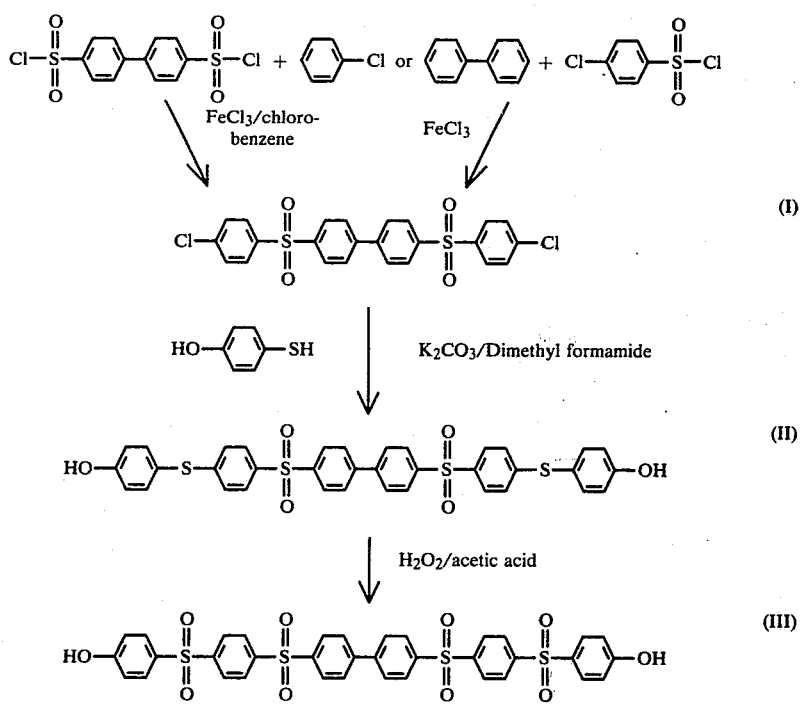

As indicated in the above suitable reaction scheme, the 4,4-bis(4-chlorophenyl sulfonyl) biphenyl precursor (I) of the preferred novel monomer of the invention can be made by two routes;

(1) by the ferric chloride catalyzed condensation of 4,4′-biphenyl disulfonyl dichloride and chlorobenzene (wherein the chlorobenzene is used as both as reactant and a solvent) or (2) by the ferric chloride catalyzed condensation of biphenyl and 4-chlorobenzene sulfonyl chloride.

The resulting 4,4′-bis(4-chlorophenyl sulfonyl) biphenyl precursor (I) is next reacted with 4-mercaptophenol in the presence of anhydrous potassium carbonate and dimethylformamide to produce the bis(4-hydroxyphenyl thiophenyl) biphenyl disulfone (II) precursor, which in turn is reacted in the presence of hydrogen peroxide and acetic acid to produce the preferred bis(4-hydroxyphenyl sulfonylphenyl) biphenyl disulfone (III) of the present invention.

The generic bis(4-hydroxyphenyl sulfonylphenyl) biphenyl disulfones of the invention are useful as monomers or one of the comonomers in the synthesis of polycarbonates, polyurethanes, polyesters, polysulfones, polyethers and other polymers.

Such polycarbonates may be produced using the novel monomers of the invention by well known methods, such as disclosed in U.S. Pat. Nos. 2,964,794; 2,970,131; 2,991,237; 2,999,835; 3,028,365; 3,153,008; 3,187,065; 3,215,668 and 3,248,414, all incorporated herein by reference, and in the monograph H. Schnell, *Chemistry and Physics of Polycarbonates*, Interscience Publishers, New York, N.Y., 1964.

Such polyurethanes may be produced using the novel monomers of the invention by well-known methods, such as disclosed in U.S. Pat. Nos. 2,266,777; 2,284,637; 2,284,896; 2,511,544, all incorporated herein by reference and in the text *Polyurethanes: Chemistry and Technology*, Vol. 1, S. H. Saunders and K. C. Frisch, Interscience Publishers, New York, N.Y., 1964.

Such polyesters may be produced using the novel monomers of the invention by well-known methods, such as disclosed in U.S. Pat. Nos. 2,980,650; 3,185,668; 3,185,670 and 3,268,482, all incorporated herein by reference, and in the text *Polyesters* (two parts), edited by Norman G. Gaylord, Interscience Publishers, New York, 1962.

Such polysulfones may be produced using the novel monomers of the invention by well-known methods such as disclosed in U.S. Pat. Nos. 3,236,808; 3,236,809; 3,409,599 and 3,742,087, all incorporated herein by reference.

Such polyethers may be produced using the novel monomers of the invention by well-known methods such as described in U.S. Pat. Nos. 1,922,459; 2,253,723; 2,991,313 and 3,651,151, all incorporated herein by reference, and in the text *Polyethers* (three parts) edited by Norman G. Gaylord, Interscience Publishers, New York, 1962.

The invention will be further illustrated, but is not intended to be limited, by the following examples.

EXAMPLES

Synthesis of 4,4'-bis(4-chlorophenyl sulfonyl) biphenyl precursor (I)

Route 1

To a three-necked 12 liter flask fitted with a stirrer, a condenser, a thermometer, nitrogen gas inlet and outlet (the outlet being connected to the bubbler to absorb the evolved hydrogen chloride gas during the reaction) was added 7.8 liters of distilled monochlorobenzene (MCB) and 5 lbs. of 4,4'-biphenyl disulfonyl dichloride (referred to as ALDI, commercially available from Uniroyal, Inc.). This mixture was heated to 70° C. in a nitrogen atmosphere, and the ALDI was completely dissolved in MCB. 65 gms of anhydrous ferric chloride was added, and the reaction mixture heated to 130° C. and held at this temperature until the evolution of hydrogen chloride gas subsided (about 20 hrs.). The tan colored product which separated out from the reaction medium was filtered and air dried to give 5 lbs. (about 84% yield) of crude product. The crude product was crystallized from dimethyl formamide to give white crystals (m.p. 269°–272° C.) which was identified by infrared (IR) and nuclear magnetic resonance (NMR) spectra as 4,4'-bis(4-chlorophenyl sulfonyl) biphenyl.

Analysis—Calcd. for $C_{24}H_{16}S_2O_4Cl_2$ (m. wt. 503.4), Theory: % C, 57.26; % H, 3.20; % S, 12.71; % Cl, 14.11, Found: % C, 57.17; % H, 3.18; % S, 12.55; % Cl, 13.90.

Route 2

To a stirred mixture of biphenyl (30.8 g) and 4-chlorobenzene sulfonyl chloride (95.95 g) (1:2.25 molar ratio) at 70° C. was added anhydrous ferric chloride (6 g). The temperature was increased to 140° C. in 1 hr. causing a steady evolution of hydrogen chloride gas. After approximately one hour, the reaction mixture solidified. Heating was continued for another two hours in the solid state. The solid mass was dissolved in dimethyl formamide (DMF) and upon cooling 4,4'-bis(4-chlorophenyl sulfonyl) biphenyl crystallized out. A second purification from DMF led to pale yellow crystalline product (m.p. 269°–272° C.). A 45% conversion was obtained after purification.

Products obtained by Route 1 and Route 2 had identical infrared spectrum, even though formation of isomeric products is possible by Route 1. As the reaction product separated quite readily from the reaction medium, it can be filtered and purified easily. From this point of view as well as higher conversion, Route 1 is the preferred method.

Synthesis of bis(4-hydroxyphenyl thiophenyl) biphenyl disulfone precursor (II)

To a three-necked 3 liter flask fitted with a stirrer, nitrogen inlet and outlet, a thermometer, a condenser and addition funnel was added 63 g (0.5 mol) of 4 mercaptophenol (available from Crown Zellerbach), 76 g (0.55 mol) of anhydrous potassium carbonate (granular) and 750 ml of distilled dimethyl formamide. The mixture was heated to 90° C. under nitrogen atmosphere. A bright yellow color, due to formation of thiophenoxy anion was observed around 60°–90° C. The reaction mixture was stirred at 90° C. for 2 hrs. and then 126 g (0.25 mol) of bis(4-chlorophenyl sulfonyl) biphenyl dissolved in 300 ml of warm dimethyl formamide was added in 30 min. The intensity of bright yellow color faded slowly as the nucleophilic displacement of chlorine by the thiophenoxide anion progressed. The reaction mixture was held at 90°–100° C. for 3 hrs. The reaction mixture was filtered while hot to remove potassium salts. The filtrate was diluted with 2 liters of water and then acidified to pH 6. The white precipitate was filtered and dried to yield 165 g (97% yield) of crude product. The crude product, on crystallization from glacial acetic acid, gave white powdery (m.p. 235°–237° C.) and was identified by infrared and NMR spectra as bis(4-hydroxyphenyl thiophenyl) biphenyl disulfone.

Analysis—Calcd. for $C_{36}H_{26}S_4O_6$ (m. wt. 682.57), Theory: % C, 63.34; % H, 3.84; % S, 18.75, Found: % C, 63.23; % H, 3.80; % S, 19.02.

The diacetate of this monomer with m.p. 195° C. was synthesized as an aid to further characterization with the following analysis:

Analysis—Calcd. for $C_{40}H_{30}S_4O_8$ (m. wt. 766.64), Theory: % C, 62.66; % H, 3.94; % S, 16.74, Found: % C, 62.66; % H, 3.54; % S, 16.74.

Synthesis of bis(4-hydroxyphenyl sulfonylphenyl) biphenyl disulfone (III)

To a three-necked 500 ml flask fitted with a stirrer, condenser and thermometer was added 16.6 g of bis(4-hydroxyphenyl thiophenyl) biphenyl disulfone (II) and 200 ml of 50% acetic acid. This mixture was heated to 90° C. whereby precursor (II) dissolved. 100 ml of 30% aqueous hydrogen peroxide solution was added. A white precipitate separated within 15 min. after the addition of hydrogen peroxide. The reaction mixture was held at 100° C. for 2 hrs., and the white precipitate was filtered and washed with water. The white powdery material (17.1 g; 86.8% yield) thus obtained after drying under vacuum overnight was crystallized from dimethyl formamide (m.p. >290° C.) and was identified by infrared and NMR spectra as bis(4-hydroxyphenyl sulfonylphenyl) biphenyl disulfone.

Analysis—Calcd. for $C_{36}H_{26}S_4O_{10}$ (m.wt. 746.64); Theory: % C, 57.91; % H, 3.51; % S, 17.14; Found: % C, 58.08; % H, 3.58; % S, 17.04.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A monomer of the structural formula:

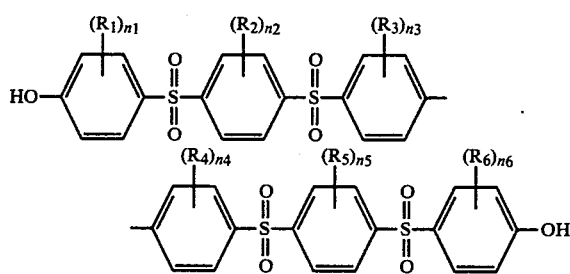

wherein
$R_1$, $R_2$, $R_3$, $R_4$, $R_5$ and $R_6$, which may be the same or different, are $C_1$–$C_4$-alkyl, Cl or Br, and
$n_1$, $n_2$, $n_3$, $n_4$, $n_5$ and $n_6$, which may be the same or different, are 0, 1 or 2.

2. The monomer of claim 1 of the structural formula:

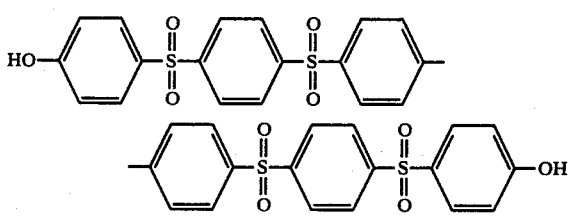

3. A process for the production of the monomer of claim 2 comprising
   (a) reacting 4,4'-bis(4-chlorophenyl sulfonyl) biphenyl in the presence of sufficient amounts of 4-mercaptophenol, potassium carbonate and dimethyl formamide and under reaction conditions sufficient to produce bis(4-hydroxyphenol thiophenyl) biphenyl disulfone, and
   (b) reacting the bis(4-hydroxyphenyl thiophenyl) biphenyl disulfone in the presence of sufficient amounts of acetic acid and hydrogen peroxide and under reaction conditions sufficient to produce said monomer.

4. A polycarbonate comprising structural units of the formula:

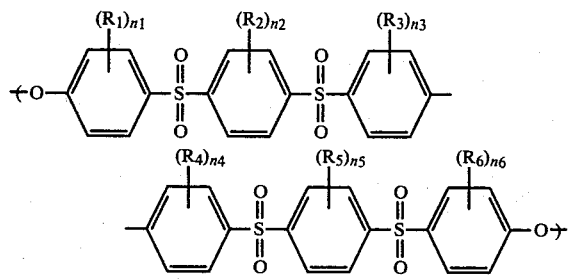

wherein
$R_1$, $R_2$, $R_3$, $R_4$, $R_5$ and $R_6$, which may be the same or different, are $C_1$–$C_4$-alkyl, Cl or Br, and
$n_1$, $n_2$, $n_3$, $n_4$, $n_5$ and $n_6$, which may be the same or different, are 0, 1 or 2.

5. A polyurethane comprising structural units of the formula:

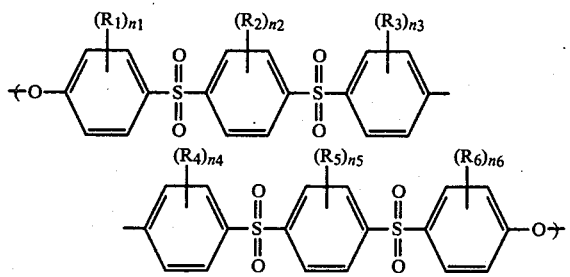

wherein
$R_1$, $R_2$, $R_3$, $R_4$, $R_5$ and $R_6$, which may be the same or different, are $C_1$–$C_4$-alkyl, Cl or Br, and
$n_1$, $n_2$, $n_3$, $n_4$, $n_5$ and $n_6$, which may be the same or different, are 0, 1 or 2.

6. A polyester comprising structural units of the formula:

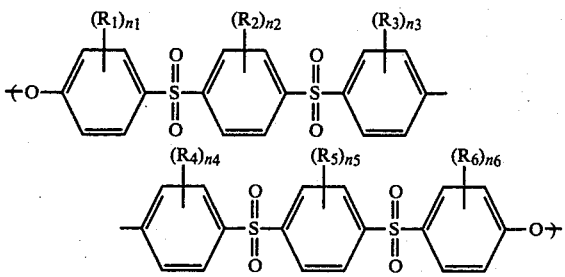

wherein
$R_1$, $R_2$, $R_3$, $R_4$, $R_5$ and $R_6$, which may be the same or different, are $C_1$–$C_4$-alkyl, Cl or Br, and
$n_1$, $n_2$, $n_3$, $n_4$, $n_5$ and $n_6$, which may be the same or different, are 0, 1 or 2.

7. A polysulfone comprising structural units of the formula:

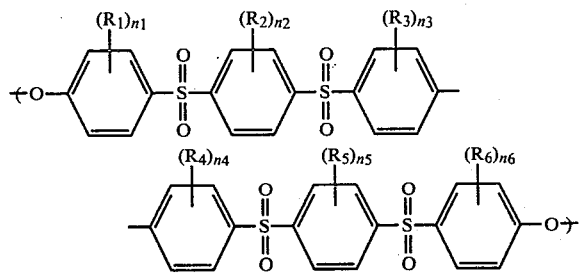

wherein $R_1$, $R_2$, $R_3$, $R_4$, $R_5$ and $R_6$, which may be the same or different, are $C_1$–$C_4$-alkyl, Cl or Br, and $n_1$, $n_2$, $n_3$, $n_4$, $n_5$ and $n_6$, which may be the same or different, are 0, 1 or 2.

8. A polyether comprising structural units of the formula:

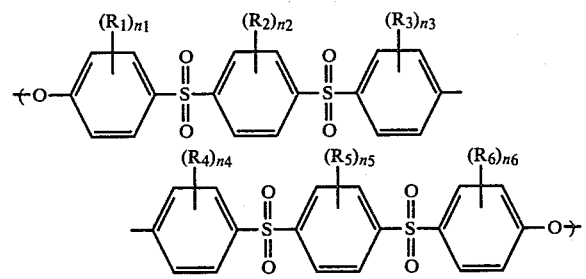

wherein $R_1$, $R_2$, $R_3$, $R_4$, $R_5$ and $R_6$, which may be the same or different, are $C_1$–$C_4$-alkyl, Cl or Br, and $n_1$, $n_2$, $n_3$, $n_4$, $n_5$ and $n_6$, which may be the same or different, are 0, 1 or 2.

9. A process for preparing an aromatic polycarbonate comprising reacting the monomer produced by the process of claim 3 with a member selected from the group consisting of carbonyl bromide, phosgene, the bis-choroformic ester of the monomer produced by the process of claim 3 and diaryl carbonates.

10. The process according to claim 3 wherein said 4,4′-bis(4-chlorophenyl sufonyl) biphenyl is produced by reacting sufficient amounts of monochlorobenzene and 4,4′-biphenyl disulfonyl in the presence of a catalytically effective amount of ferric chloride and under reaction conditions sufficient to produce 4,4′-bis(4-chlorophenyl sufonyl)biphenyl.

11. The process according to claim 3 wherein said 4,4′-bis(4-chlorophenyl sulfonyl) biphenyl is produced by reacting sufficient amounts of biphenyl and 4-chlorobenzene sulfonyl chloride in the presence of a catalytically effective amount of ferric chloride and under reaction conditions sufficient to produce 4,4′-bis(4-chlorophenyl sulfonyl)biphenyl.

12. The polycarbonate of claim 4 wherein $n_1$, $n_2$, $n_3$, $n_4$, $n_5$ and $n_6$ are all equal to 0.

13. The polyurethane of claim 5 wherein $n_1$, $n_2$, $n_3$, $n_4$, $n_5$ and $n_6$ are all equal to 0.

14. The polyester of claim 6 wherein $n_1$, $n_2$, $n_3$, $n_4$, $n_5$ and $n_6$ are all equal to 0.

15. The polysulfone of claim 7 wherein $n_1$, $n_2$, $n_3$, $n_4$, $n_5$ and $n_6$ are all equal to 0.

16. The polyether of claim 8 wherein $n_1$, $n_2$, $n_3$, $n_4$, $n_5$ and $n_6$ are all equal to 0.

* * * * *